United States Patent
France et al.

(10) Patent No.: US 7,716,126 B2
(45) Date of Patent: May 11, 2010

(54) METHOD OF FACILITATING PARTICIPATION IN LOTTERIES

(75) Inventors: Donald France, Elkton, MD (US); Matthew J. Urban, Wilmington, DE (US); Robert McWilliams, Wilmington, DE (US)

(73) Assignee: U-PickIt.com, Inc., Bear, DE (US)

( * ) Notice: Subject to any disclaimer, the term of this patent is extended or adjusted under 35 U.S.C. 154(b) by 1563 days.

(21) Appl. No.: 09/912,490

(22) Filed: Jul. 26, 2001

(65) Prior Publication Data

US 2003/0023547 A1  Jan. 30, 2003

(51) Int. Cl.
*G06Q 40/00* (2006.01)

(52) U.S. Cl. .......................................... 705/39; 705/40

(58) Field of Classification Search ................ 705/27, 705/37, 39–40, 14; 463/17–27, 42
See application file for complete search history.

(56) References Cited

U.S. PATENT DOCUMENTS

| | | | | |
|---|---|---|---|---|
| 5,112,050 A * | 5/1992 | Koza et al. | ..................... | 463/17 |
| 5,354,069 A * | 10/1994 | Guttman et al. | ............... | 463/25 |
| 5,921,865 A * | 7/1999 | Scagnelli et al. | ............... | 463/17 |
| 6,024,641 A * | 2/2000 | Sarno | ........................... | 463/17 |
| 6,086,477 A * | 7/2000 | Walker et al. | .................. | 463/17 |
| 6,254,480 B1 * | 7/2001 | Zach | ........................... | 463/17 |
| 6,277,026 B1 * | 8/2001 | Archer | ......................... | 463/42 |
| 6,322,446 B1 | 11/2001 | Yacenda et al. | | |
| 6,383,078 B1 | 5/2002 | Yacenda | | |
| 6,454,650 B1 * | 9/2002 | Aronin | ......................... | 463/17 |
| 6,527,638 B1 * | 3/2003 | Walker et al. | .................. | 463/25 |
| 6,645,068 B1 * | 11/2003 | Kelly et al. | ..................... | 463/9 |
| 6,663,105 B1 * | 12/2003 | Sullivan et al. | ........... | 273/138.2 |
| 6,685,562 B1 * | 2/2004 | Rantanen | ...................... | 463/17 |
| 6,869,358 B2 * | 3/2005 | Yacenda | ...................... | 463/17 |
| 6,969,318 B1 * | 11/2005 | Packes et al. | .................. | 463/25 |
| 2003/0009375 A1 * | 1/2003 | Stoltz et al. | ................... | 705/14 |

OTHER PUBLICATIONS http://www.valottery.com/, filing date of 1988.*

* cited by examiner

*Primary Examiner*—Thu Thao Havan
(74) *Attorney, Agent, or Firm*—Connolly Bove Lodge & Hutz LLP; Arlene P. Neal (57) ABSTRACT

A method and system are presented for selectively entering lottery entries into a state lottery drawing via an internet web site, the method includes the initial step of entering the home page of the web site. There is querying of users for their sign-in identification to establish whether they are pre-registered user members or non-members. Pre-registered user members are presented with a choice of member functions and content as to account information, and selection of a game to be played. Non-members are presented with a choice of different functions and content including the ability to establish an account. Both members and non-members may access functions and content including information relating to gambling addiction, and descriptions of the games that may be played.

9 Claims, 5 Drawing Sheets

METHOD OF FACILITATING PARTICIPATION IN LOTTERIES

FIELD OF THE INVENTION

The present invention relates to a method and apparatus for processing lottery ticket transactions, and more particularly for processing ticket purchases by utilizing the Internet.

BACKGROUND OF THE INVENTION

Many government and private entities conduct lotteries. Government-conducted lotteries offer players the chance to win a large prize, and have the added benefit of increasing governmental revenues without burdening the public with additional taxes. In many instances, the revenue generated from a governmental lottery is dedicated, at least in part, to a particular purpose or goal, such as improving the education system or reducing property taxes.

Typically, government-conducted lottery systems utilize a central lottery computer to communicate with remote dedicated lottery terminals. A player typically selects numbers on a lottery "sense mark slip," and the lottery terminal operator inserts the sense mark slip into a reader at the lottery terminal, which optically reads the sense mark slip using a known mark sensing process. Alternatively, most lottery systems offer automatic lottery number generation features, commonly referred to as "quick-pick" systems, which randomly select lottery numbers on behalf of the player. The dedicated lottery terminal then communicates the player's selected numbers to the central lottery computer for validation and storage. After the lottery numbers have been stored, the dedicated lottery terminal, under the direction of the central lottery computer, prints and issues the official lottery ticket.

One popular lottery game, commonly referred to as "lotto," typically requires the player to choose six numbers between one and forty-two. The selected group of numbers are then compared to the winning lottery numbers, which have been randomly selected from the larger pool of numbers, between one and forty-two, at some specified time and date after purchase of the lotto ticket. To win a prize, the player-selected lotto ticket numbers must match all or some of the winning lottery numbers.

Lotto drawings are typically conducted on a periodic basis, with many state lotteries conducting "lotto" drawings as often as twice per week. Previously, players were required to appear in person at a dedicated lottery terminal to purchase their lottery tickets for each lottery drawing. In order to increase ticket sales, as well as customer-convenience, many lottery systems now offer subscription sales of lottery tickets, which automatically enter a player in the lottery game for a predefined number of weeks, often at a discounted price.

If the jackpot prize is not awarded for a particular lotto drawing, the jackpot prize value typically rolls over to increase the jackpot for the subsequent drawing. Thus, jackpots increase from week to week as no one wins. The amount of the jackpot prize is typically determined based on a sales trend from the prior year. It has been found that many people only buy lottery tickets when the jackpot exceeds a certain amount. Thus, as the jackpot prize gets larger, there is a dramatic increase in the number of tickets sold. Occasionally, when jackpots have risen to particularly large amounts, some lottery systems have not had sufficient capacity to meet the increased ticket demand.

Thus, during times of peak demand, players are met with longer lines at lottery terminals, and generally find it more frustrating to obtain a lottery ticket. Rather than providing an environment that encourages such infrequent players to become regular players, the difficulty associated with obtaining a lottery ticket for a large jackpot often discourages players from returning. While the subscription sale of lottery tickets allows regular players to enroll in all drawings for a predefined period, and thereby avoid a time-consuming trip to the lottery terminal when the jackpot increases, conventional lottery subscription sale systems do not provide a solution for infrequent players who only want to enroll in drawings associated with larger jackpot prizes.

Inherent in existing lottery systems are other limitations on their availability to persons who wish to participate in the lottery. For example, in bad weather, it is difficult for many people to negotiate travel from their homes or offices to a facility selling lottery tickets. Many people do not have cars or access to convenient public transportation needed to get to such a facility. And many elderly and handicapped are all but excluded from participation in lotteries because of a lack of the mobility needed to get from home to a lottery selling location.

Thus, there is considerable need for a system that will facilitate participation of all people in such lotteries and other authorized games of chance.

SUMMARY OF THE INVENTION

An object of this invention is to facilitate participation in a lottery by eliminating the need to be physically present to purchase a lottery ticket.

Another object of this invention is to facilitate participation of the elderly, handicapped and home bound in state lotteries.

Another object of this invention is to facilitate payment for lottery tickets through credit and debit cards, or other electronic forms of online payment, such as Billpoint.

Another unique aspect of the invention is the ability of the purchaser to subscribe online to certain lottery games. The purchaser would instruct the system to purchase tickets on some regular basis, with criteria specified by the purchaser. Funds for these transactions would be automatically deducted from the purchaser's account until such time as purchaser's pre-paid balance is exhausted.

Participants can determine whether they are winners by contacting a lottery facility agency website (LFA) at any time after a drawing. In addition, participants may request to receive automated email messages alerting them to a winning ticket. Furthermore, the website will store all winning numbers for the past year so that users can search for winning numbers from a particular date.

These and other objects are achieved through a lottery facilitation agency web site (LFA) electronically linked to the public and an authorized lottery web site. The web site offers the public memberships that facilitate access to lotteries while at the same time controlling that access to foster non-compulsive participation in lotteries and other games of chance. In the succeeding discussion, for convenience of explanation, the LFA web site will be referred to as www.U-PickIt.com The web site initiates the claimed method by maintaining a site on the World Wide Web ("Internet") that can be accessed by all who have access to an Internet Service Provider (ISP). After logging on to the web site, anyone wishing to purchase a lottery ticket must first establish an account with the web site by answering questions displayed on the site. Typical questions would involve inquiries about personal data (name, address, phone number, etc.) as well as financial data (credit or debit card information, or other online payment information).

Once an account is established by a potential lottery purchaser, that person is given an account number, a password is selected and other security protocols established to prevent unauthorized access to the account.

Once having established an account, a potential lottery purchaser is then shown a screen displaying various gaming options offered by the state of that purchaser's residence. If interstate and/or national lotteries became available, such options would also be displayed.

The potential lottery player is then instructed on the gaming options available to him/her via a screen display generated by the web site. The player selects the desired gaming options he/she wishes to pursue and then selects what the player hopes is the winning combination of numerals, letters or symbols.

The gaming options can involve instant prizes based on, for example, games of chance resembling casino slot machines. Other options include the more classical lottery in which numbers and/or letters are selected by the purchaser with the hope they match numbers and/or letter sequences drawn on a fixed date and time by the authorized state lottery authority.

Payment for participation in the lottery is handled through the purchaser's credit and/or debit card. The amount determined by the lottery authority that is needed to participate in each game of chance is debited from the lottery purchaser's debit or credit card, or other form of online payment.

Another feature of this invention is an initial screen on the web site which alerts the potential lottery purchaser to the socioeconomic harm associated with gambling. A message from Gamblers Anonymous would be displayed on the screen as soon as a potential lottery purchaser logs on to the web site. It is also contemplated that this site could be interactive to allow the purchaser to self diagnose his/her propensity (addiction) to gambling.

BRIEF DESCRIPTION OF DRAWINGS

The above-mentioned objects and advantages of the present invention will be more clearly understood when considered in conjunction with the accompanying drawings, in which.

DETAILED DESCRIPTION OF INVENTION

The primary unique aspects of this invention are the ability for users to purchase lottery tickets over the internet using a web browser, for the user to purchase tickets on a 'subscription' basis, and for the user to track and compare statistics for their own personal playing habits against the playing habits of the entire community of users on the a website, to be referred to herein as "U-PickIt.com," given as an example.

Figure 1:
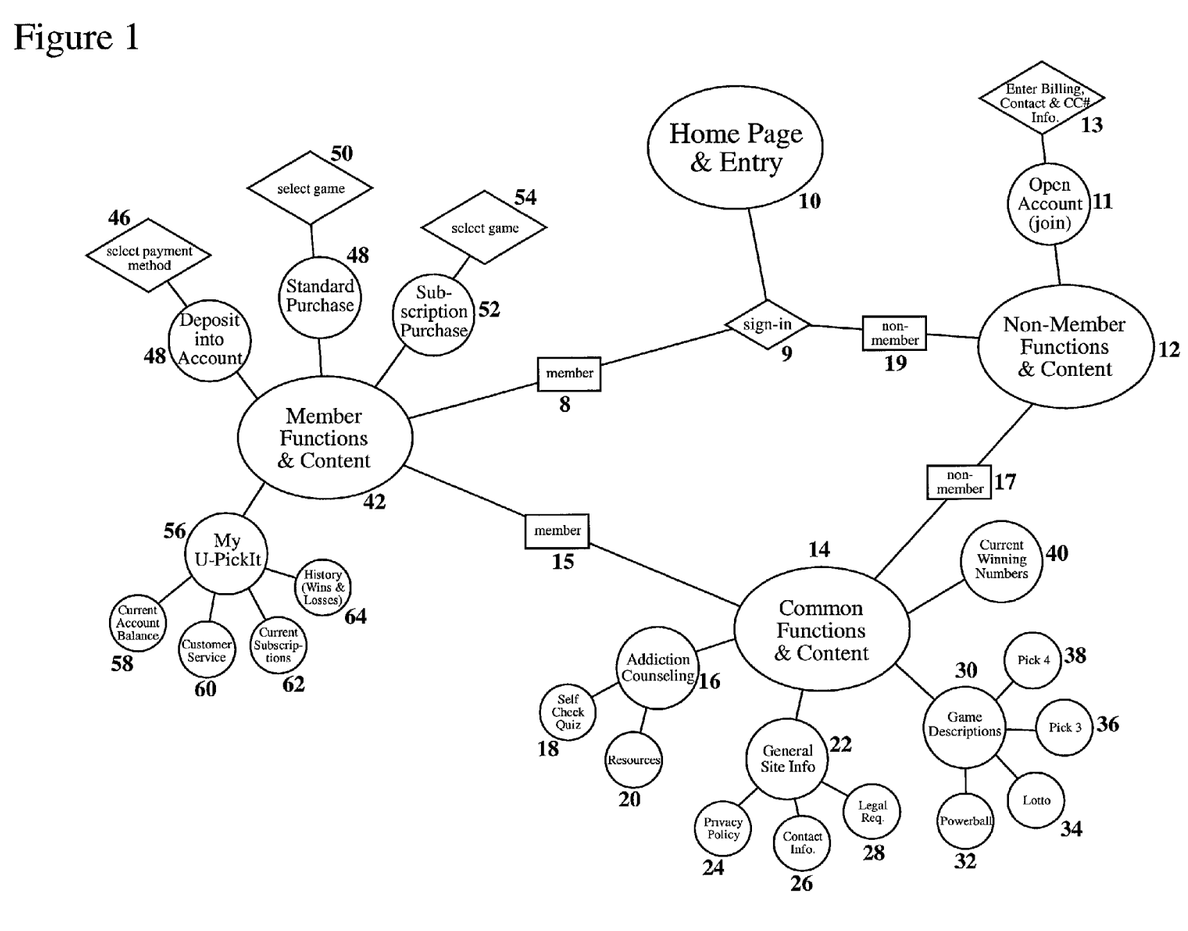
FIG. 1 is a flow diagram of the major functions of a website as employed in the present invention.

Referring now to FIG. 1, there is shown in schematic flow diagram form an overall depiction of the structure of the U-PickIt.com web site and all major functions contained therein.

Potential users connect to U-PickIt.com through any internet-ready device. Typically this access is through a web browser connected to the internet through a modem or network connection on a user's personal computer (PC); This invention may also permit access from other internet-ready devices like Palm Pilot, data equipped cell phones, or any other method of connecting to the internet known now or in the future. Access through a standard web browser will be standard web site point and click. Upon connecting, the user is presented with the home page & entry screen 10. This page will contain information about the U-PickIt.com service, an invitation to register, and a sign in screen 9.

If the user is not a member, the user will be shown (at 19) to the non-member functions and content 12. If the user is already a member, the user will be shown (at 8) to the member functions and content 42. Both members and non-members will have access to the common functions and content 14. Users of non-PC devices may be presented with limited functions and content based on the particular interactive and display capabilities of their access method. As one possible example, cell phone users may only be able to check winning numbers and place new orders, and may not be able to register trough that device. The following is a discussion of the functions and content available to members and non-members.

Non-Member Functions and Content 12

The main component of the non-member functions is the ability to sign up for an account 11. To sign up for an account, the user will enter all appropriate personal data 13, such as contact information, as well as their billing information. The user will also select a username and password to be used when accessing the web site. This information will be stored on the U-PickIt.com web server in a database, and will be used for future payment/purchase, email contact with the participant, participant preferences, and access to member functions and content of the site.

Common Functions and Content 14

The common functions will contain general, publicly accessible information that will be useful to either members 15, or non-members 17. These may include:

Addiction Counseling 16—This content will be dedicated to information related to Addiction Counseling to assist those that may feel they have a dependence on gambling. Included in this information will be links to a self check quiz function 18 that participants can fill out to help determine their level of risk with addiction gambling. An automated ranking system will report back to the user based on their input. This information will be kept strictly confidential, and none of this information will be stored on the U-PickIt.com web server. Various gambling addiction resources 20 such as treatment centers, counselors and recovery programs will be listed in this location as well.

General Information 22—The common functions and content is also where general information about the site will be displayed. This would include information about a participant's data privacy 24; what U-PickIt.com does with information that is stored in the system databases. Other components of the general information content will also contain contact information 26 for reaching the U-PickIt.com offices, and any legal requirements 28 applicable for using the U-PickIt.com system.

Game Descriptions 30—The common functions and content will include text information and complete descriptions of the lottery games available for play through U-PickIt.com. This would include games such as Powerball (32), Lotto (34), Pick 3 (36), Pick 4 (38), and any other games as determined by U-PickIt.com. Vital content information contained in this section would include days/times available for play, official lottery rules and regulations, odds of winning, and any other information applicable to the particular games in question. Some additional content in this area may be exclusively available to members.

Current Winning Numbers 40—This will contain an "at-a-glance" summary of winning numbers from all games supported by U-PickIt.com from the last week. The last day's numbers will be prominently featured, with secondary featuring to the 6 days prior. The winning lottery numbers will be stored in the U-PickIt.com database, and automatically rotated based on the current date.

Member Functions and Content 42

Deposit Into Account 44—This is a key function of the U-PickIt.com web site. Through this function the user can select to deposit money into their personal U-PickIt.com account. When the user selects this option, they are presented with a list of available payment methods, and instructed that they are pre-paying for future lottery plays. Upon selecting a payment method 46, the users enter an amount that they wish to pre-pay into their accounts. The U-PickIt.com web system then deducts these amounts from the payment method of the user's choosing, and adds this amount to the user's U-PickIt.com account credit. This will occur in near real-time. The U-PickIt.com system will be directly tied into eCommerce facilitation agencies as needed to facilitate these financial transactions. The participant will be emailed a receipt of their transaction, and directed to print out a receipt that will be displayed in the web browser window.

Standard Purchase 48—Through this function, a registered user can purchase tickets for any of the games supported by U-PickIt.com. The experience for the participant will be similar to the experience of purchasing lottery tickets from a ticket agent. The user will select a lottery game 50, select the game options (box variations for example), select the number of tickets they want to purchase, and either select the numbers to play or let the system randomly determine the numbers to play for their ticket purchase. Once the user completes the purchase, the user will be shown a receipt/confirmation containing all relevant information about the game, game options, numbers chosen, and tickets purchased and directed to print this information. This printout will also contain a unique identifier that will be used in conjunction with the user's personal identification to either claim an actual lottery ticket from the U-PickIt.com storage facility or serve as a verification of purchase for redemption of winning purchases.

Subscription Purchase 52—One of the unique aspects of this invention is the ability for users to purchase lottery tickets on a regular, automated basis by 'subscribing' to a particular game or list of games. Furthermore, a user could select a list of various number combinations to play and subscribe to multiple variations within the same or different game. The method to facilitate this will be substantially similar to 'Standard Purchase' above, with the exception that the user will be authorizing the U-PickIt.com site to purchase tickets on the user's behalf, at a quantity and frequency as determined by the user.

My U-PickIt.com 56—This will contain user-customized information of a supplemental/informational nature. This will include the user's current account balance 58 (monies paid in 'credit' to the U-PickIt.com site), various customer service options 60 (including on-line tech support if applicable), a list of the user's current lottery game subscriptions 62 with full details about frequency, variation and quantity, and the user's personal history of wins and losses 64 with calculated percentage statistics illustrating the same.

Figure 2:
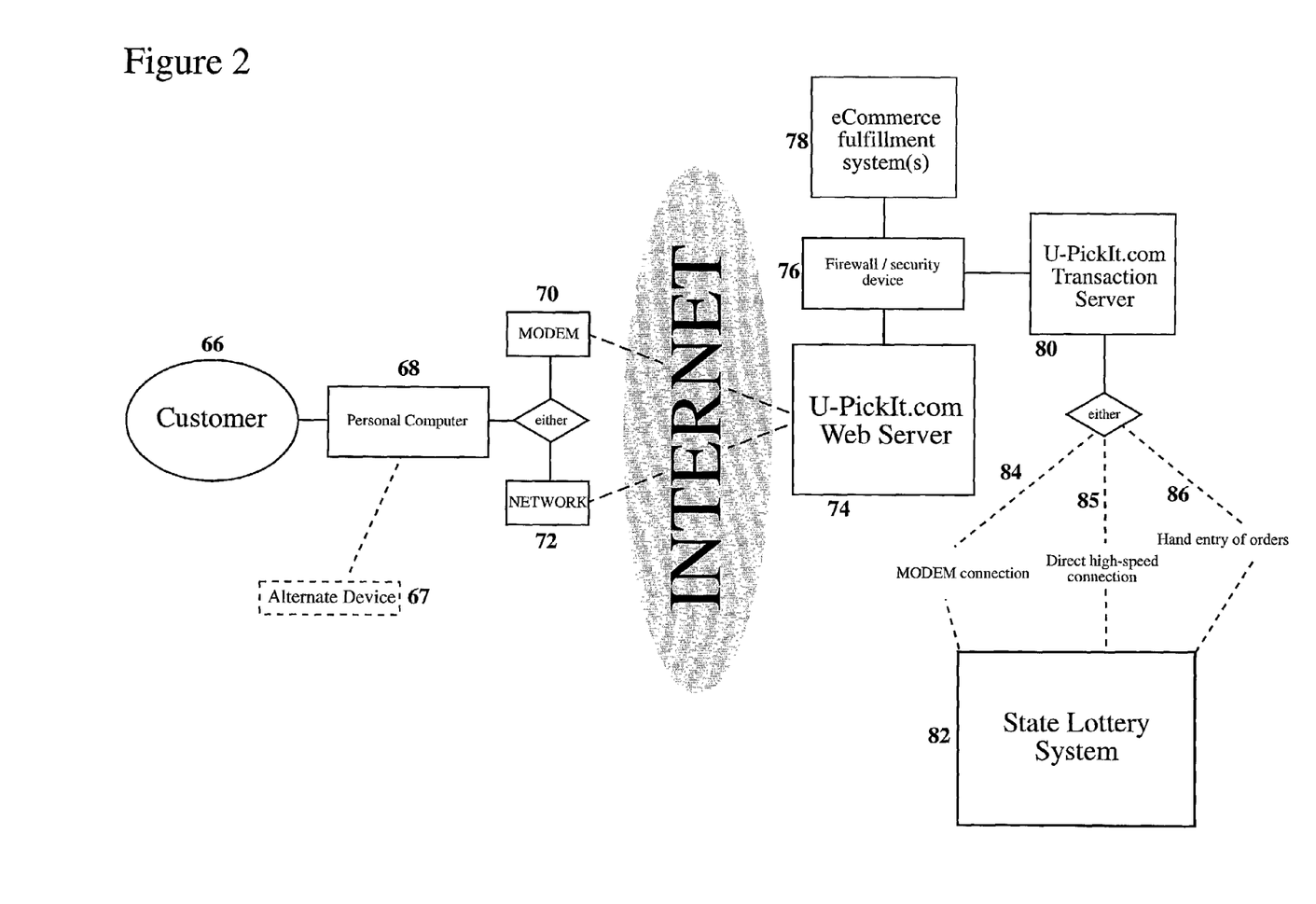
FIG. 2 is a flow diagram of a connection from a user of a website as employed in the present invention, to a state lottery agency.

Referring now to FIG. 2, there is shown in schematic flow diagram form an overall depiction of the connection from the user to the U-PickIt.com web site, and (in summary form) from the U-PickIt.com web site to the state lottery agency.

To connect to the U-PickIt.com web site, the customer will use an internet-ready device. This is typically, but not limited to, a personal computer (PC) 68 equipped with a modem device 70, a high-speed direct connection such as a Digital Signal Line (DSL), T1, T3, Cable Modem, or a network connection 72 to a similar high speed access line. The user's computer will establish a connection to a service host and will at this point be connected to the internet through standard IP protocols. Alternate methods of connection could be wireless palm devices like the Palm Pilot, web-ready cell phones, and any other internet-ready device known now or in the future (67).

When the participant is connected to the internet, the U-PickIt.com web site will be accessible by their web browsing software at a web address, such as http://www.U-PickIt.com. Connecting to this address (URL) will initiate a connection between the user and the U-PickIt.com web server system 74.

The U-PickIt.com web server system will consist of one or more networked machines that are programmed to interact with the participant. All of the functions illustrated in FIG. 1 and described above will be available to the participant when the participant is connected through a standard PC. Limited options may be available to users of other internet-ready devices.

When the user successfully completes the sequence of steps necessary to cause a financial transaction event (payment from a credit card, debit card, or other electronic payment method), the U-PickIt.com system will transmit and receive information to/from a conventional eCommerce fulfillment system 78. This transmission will occur over a secure data transmission using standard IP/SSL protocols, or any other internet protocols known now or in the future. This transmission will be sent through a firewall device 76, a standard security measure placed between web servers, and other internal or external networks known now or in the future.

When the user successfully completes the sequence of steps necessary to cause a lottery ticket purchase (subtracting from the participant's account with U-PickIt.com), the U-PickIt.com system will transmit this information from the fulfillment system 78, again through the firewall device, to the U-PickIt.com transaction server 80. This transaction server will be programmed specifically to act as a liaison between the U-PickIt.com web server and a State lottery system(s) 82.

When a successful ticket purchase is made, there will be three potential methods for connecting to the state lottery agency. These will be explained in more detail with regards to FIGS. 3, 4 and 5, but in summary, there will be either a direct electronic connection 84 to the state lottery system using a 'lottery terminal emulator server', or a direct electronic connection 85 to the state lottery system over a wide area network/dedicated connection or a connection established through use of a standard state lottery terminal, and U-PickIt.com staff members 86.

Figure 3:
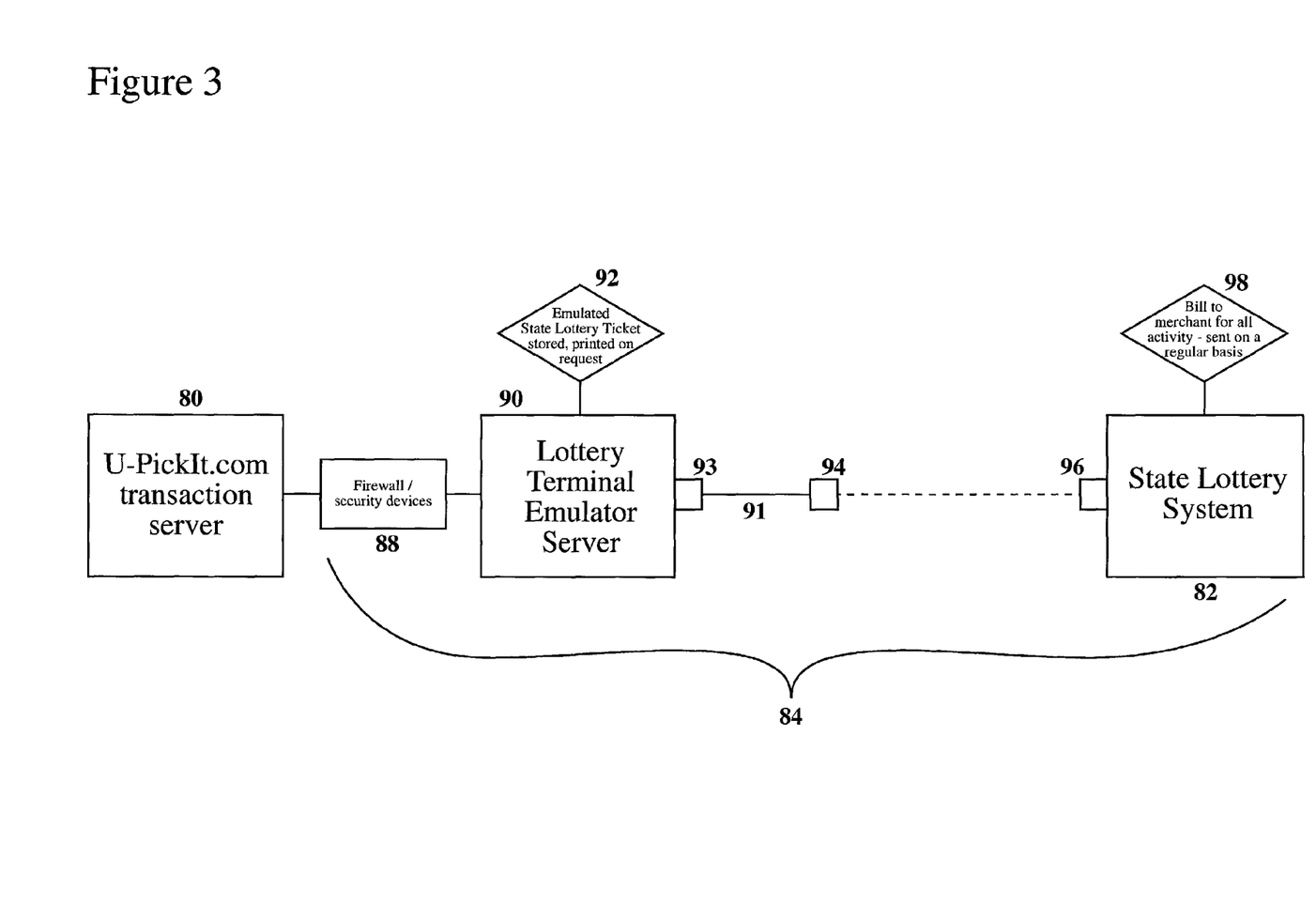
FIG. 3 shows a mode of manual entry to an existing lottery terminal as a first option in accordance with the present invention.

There are three methods for connecting to the state lottery system. Referring now to FIG. 3, there is shown a first connection method, in schematic flow diagram form as an overall depiction of a direct connection from the U-PickIt.com transaction server 80 to the state lottery system 82.

Figure 4:
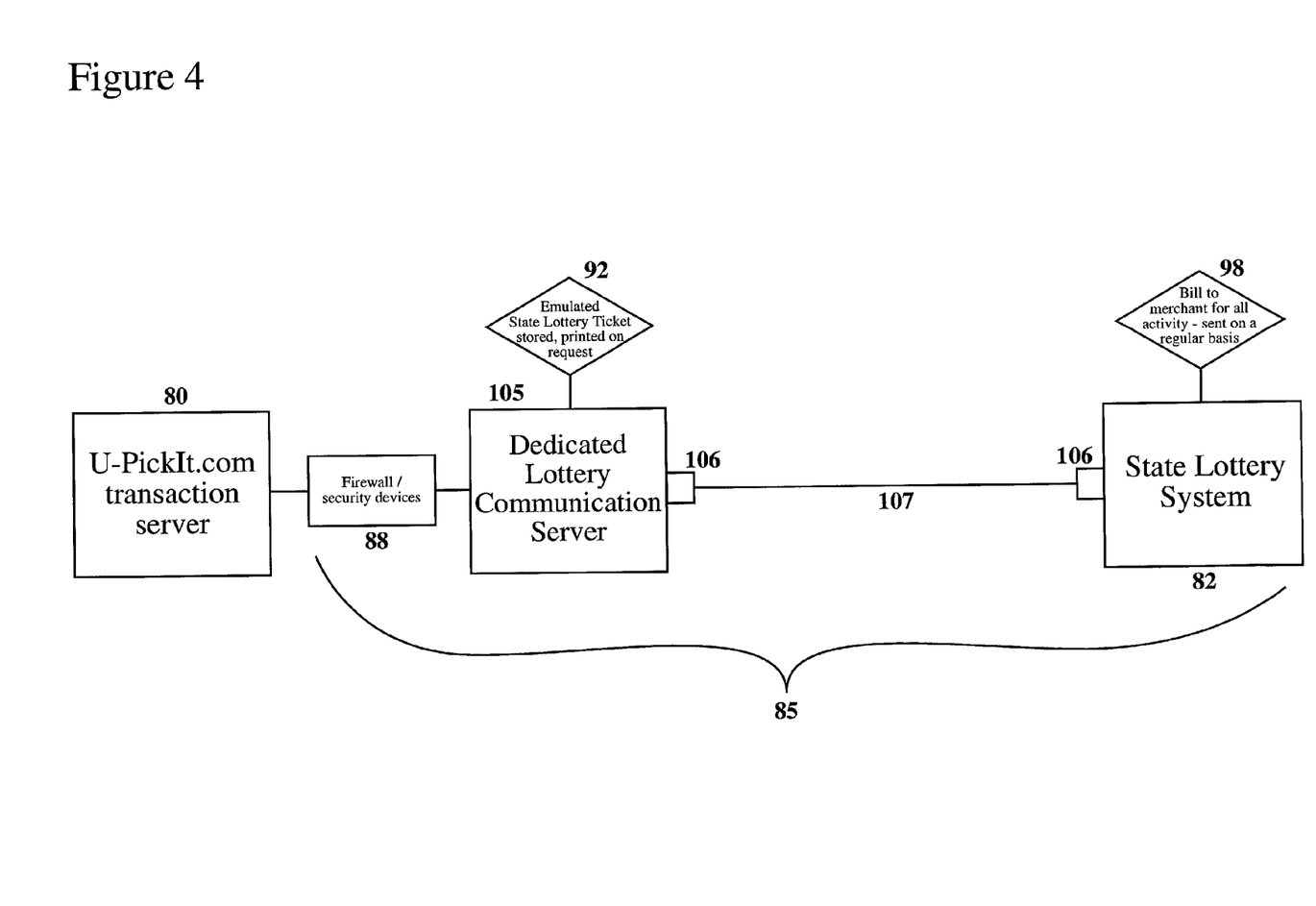
FIG. 4 shows a mode of directly interfacing to a lottery system as a second option in accordance with the present invention.

The first connection method is a direct connection to the state lottery system 82 by use of a separate server system 90 that is programmed to emulate a standard state lottery sales terminal. The emulator server system receives input data from transaction server 80 through a standard firewall 88. This machine will connect to the state lottery system's fulfillment server in the same manner as the existing lottery terminal, and will use existing lottery communication protocols. Current lottery transmission protocols include transmission over a regular, non-dedicated (on-demand) phone line 91 and standard RJ 11 phone jack 94. Modems 93 and 96 provide data connections between the server 90 and the state lottery system 82. Successful ticket purchases will be temporarily stored (92) on this separate server and then transmitted to the state lottery system 82. The state lottery system will respond to this transmission with confirmation which will then be relayed to the end-user, back through the transaction server 80, firewall 88, and web server system 74, and ten back to the user in a secure encrypted form. In this instance, actual lottery tickets are not printed, and the user's receipt is needed to redeem for an actual ticket, which will be printed upon demand, or to verify purchase in order to claim any awards. It is noted that this method of communicating with the state lottery system requires full participation from the state lottery system and the state lottery system's vendor to accomplish the standard lottery terminal emulation, The second connection method, shown in FIG. 4, is a direct connection to the state lottery system 82 by use of a wide area network or another dedicated electronic connection. A dedicated lottery communication server 105 will connect to the state lottery system's fulfillment server using existing lottery communication protocols. The connection is completed between interconnected devices 106 and connection 107. With this method, the U-PickIt.com system will actually be a part of the state lottery agency network.

Successful ticket purchases will be temporarily stored (92) on this separate server and also instantly transmitted to the state lottery system 82. The state lottery system will respond to this transmission with confirmation which will ten be relayed to the end-user, back through the transaction server 80, firewall 88, and web server system 74, and then back to the user in a secure encrypted form. In this instance, actual lottery tickets are not printed, and the user's receipt is needed to redeem for an actual ticket, which will be printed upon demand, or to verify purchase to claim awards. It is noted that this method of communicating with the state lottery system requires fall participation from the state lottery system and the state lottery system's vendor to accomplish the direct electronic connection.

Figure 5:
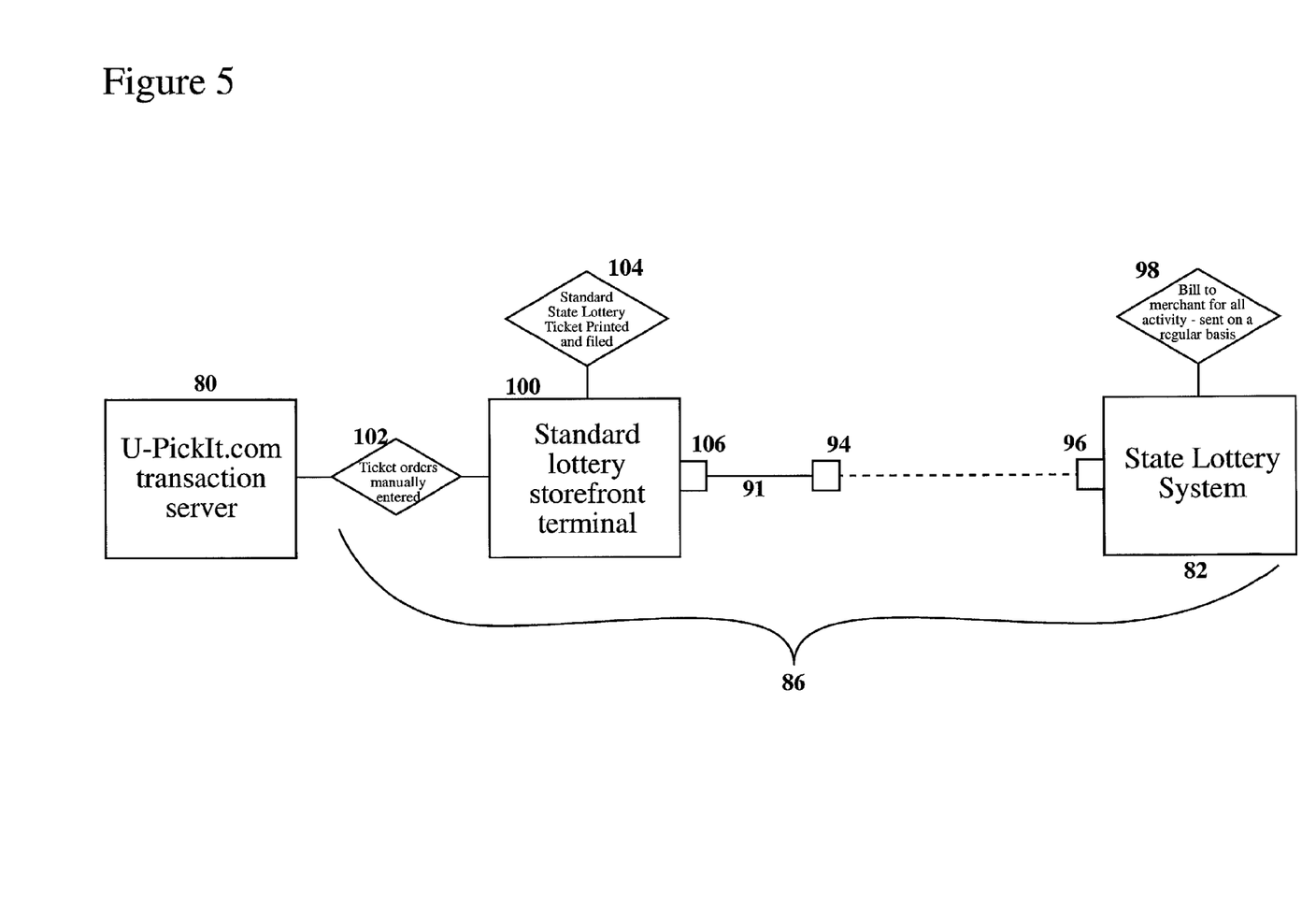
FIG. 5 shows another possible mode of directly interfacing to a lottery system as a third option in accordance with the present invention.

The third possible method, shown in FIG. 5, is a non-automated connection 86 to the state lottery system 82. By this method, the successful ticket purchases will be transmitted to the U-PickIt.com transaction server 80, and then stored for human retrieval. U-PickIt.com representatives will be staffed to receive and hand key enter the game orders 102 into (a) standard lottery terminal(s) 100 located at the U-PickIt.com fulfillment center. In this instance, U-PickIt.com will be operating as if it were any other lottery ticket merchant. Once the information is entered, the standard lottery terminal will transmit to the state lottery system 82 using standard connection and protocols. Current lottery transmission protocols include transmission over a regular, non-dedicated (on-demand) phone line 91. The phone line 91 may have modems 106, 96 connecting the terminal 100 to the state lottery system 82 in the same manner as shown in FIG. 3. Also, a corresponding intermediary phone jack 94 may be installed. When an order is entered into the lottery terminal successfully, an official lottery ticket will be printed and filed (104) at the U-PickIt.com fulfillment center. The U-PickIt.com representative will then initiate a confirmation that will be sent to the user for filing. This confirmation, along with photo identification, will be required for the user to retrieve their actual lottery ticket.

In actual operation of the system, it is anticipated that, to initiate registration, a user logs onto the U-PickIt.com website. Each individual who wants to purchase a ticket must open an account and this requires an individual to specify name, address, e-mail, and a credit card number. In order to conform to most state age requirements, the user must warrant that he/she is over 18 years of age. The user then accepts an agreement stating that U-PickIt.com is authorized to purchase lottery tickets on the user's behalf.

To order tickets, the user performs a credit card transaction where a "prepayment" is deposited into a personal U-PickIt.com account. From that point on, the user may log onto the site and be informed as to the account balance. Once the account reaches zero, the system will prompt the user to authorize an additional payment. When the user purchases a ticket, the cost is deducted from the user's account. The ticket(s) order are printed and stored at the U-PickIt.com facility. Alternately, the system may be programmed to provide 'pay as you go' purchases, where the user pays for each ticket upon purchase. Regarding winnings, there are generally two options. If the user does not win, U-PickIt.com may hold the ticket for one month before discarding it as a worthless ticket. If there is a win, the winner is notified and the ticket is held for one year for the winner to pick it up. If the winning amount is less than a nominal amount, such as $500, the winner may be given the option of transferring the ticket to U-PickIt.com and having the winning amount credited to their account, or possibly back to their original credit card account.

The lottery system effectively has a database for all users. Users can set up standing subscription orders. For example, the user may subscribe to the purchase of three tickets of Pick 4. In order to provide variety for the enterprise, it is possible to offer order options. These may include picking random numbers for the user, playing specific numbers, or any combination of the prior two.

Effectively, the U-PickIt.com system communicates directly with the state lottery agency. The agency acts as a standard terminal and performs a dial-up function just as performed by existing lottery machines. The interface between the U-PickIt.com system and the lottery system could actually be a human if need be. This individual would enter all the orders into the terminal as they arrive. This would allow the operation to closely resemble that of a standard merchant in case certain states have laws or rules prohibiting on-line lottery transactions from start to finish.

The website system stores the numbers played by each user and will e-mail the user a confirmation of a win when that occurs. The user can also log onto the site and check to see whether they have won, or to see a list of previous winning numbers. Once the user purchases a ticket, an e-mail confirmation is sent. The user may be directed to print the e-mail confirmation which may contain a barcode. This confirmation may be matched up with a page at the U-PickIt.com office. In order to obtain their actual ticket or to confirm purchase in order to claim an award, a user will have to present himself at the U-PickIt.com office with their printed confirmation form and a photo ID. This will be compared with the database records on the website server and the user will then be given their ticket or their award claim.

It is to be noted that the present invention is not limited to the embodiments described and/or illustrated. Rather, the invention encompasses all the variants thereof which fall within the scope of the invention.

What is claimed is:

1. A method for selectively entering lottery entries into a state lottery drawing, administered by a state lottery agency, via an internet web site, the method comprising the steps of:
    receiving user access at the home page of the web site;
    querying users for their sign-in identification to establish whether they are pre-registered user members or non-members;
    presenting pre-registered user members with a choice of member functions and content including providing access to a subscription purchasing service;
    presenting non-members with a choice of non-member functions and content;
and
    communicating selected information to the state lottery agency,
    wherein the choice of member functions and content presented to pre-registered user members further comprises accessing a member's account for selectively determining a current balance, customer service options, history of wins and losses, and subscriptions for play that are currently active,
    wherein the history of wins and losses is illustrated by calculated statistical percentages,
    wherein confidential addiction counseling is provided at least through a self-check quiz and addiction risk ranking function, and
    wherein the subscription purchasing service provides members with an ability to subscribe to at least one of a game and a list of games; and select and play a list of various number combinations in at least the one game and the list of games.

2. The method set forth in claim 1 wherein member choice of functions and content include
    depositing funds into the members' pre-established accounts; and
    permitting the members to select an offered lottery game to play after a choice is made as to payment thereof.

3. The method set forth in claim 1 wherein the non-member's choice of functions and content includes the establishment of an account for future play.

4. The method set forth in claim 1 wherein the common functions and content for members and non-members selectively includes
    accessing information concerning: the web site, gambling addiction, and descriptions of the games that may be played.

5. A method for selectively entering lottery entries into a state lottery drawing via an internet web site, the method comprising the steps of:
    receiving user access at an internet web site server;
    connecting the web server to a transaction server via a security firewall;
    selectively connecting the transaction server to a state lottery system either through:
        a) a modem connection;
        b) direct high speed connection; or
        c) an intermediary manual reentry of member orders from members, received at the web site and
    providing access to a subscription purchasing service for members,
    wherein the history of wins and losses is illustrated by calculated statistical percentages,
    wherein confidential addiction counseling is provided at least through a self check quiz and addiction risk ranking function, and
    wherein the subscription purchasing service for members further comprises subscribing to at least one of a game and a list of games; and selecting a list of various number combinations in at least the one game and the list of games to play.

6. The method of claim 1 wherein the subscription service provides for lottery entries of an amount and frequency selected by the user.

7. The method of claim 1 wherein the subscription purchasing service provides for lottery entries of a predetermined amount and frequency.

8. The method of claim 1 which further includes presenting both members and non-members with a choice of common functions and content.

9. The method of claim 5 which further includes presenting both members and non-members with a choice of common functions and content.

* * * * *

UNITED STATES PATENT AND TRADEMARK OFFICE
CERTIFICATE OF CORRECTION

| | | |
|---|---|---|
| PATENT NO. | : 7,716,126 B2 | Page 1 of 1 |
| APPLICATION NO. | : 09/912490 | |
| DATED | : May 11, 2010 | |
| INVENTOR(S) | : France et al. | |

It is certified that error appears in the above-identified patent and that said Letters Patent is hereby corrected as shown below:

In Col. 3, line 67; Col. 4, lines 3, 5, 15, 37, 54, 62, 65, and 66; Col. 5, lines 3, 6, 15, 18, 23, 25, 30, 32, 33, 42, 54, 65; Col. 6, lines 1, 4, 12, 13, 15, 28, 31, 33, 43, 35, 58 and 60; Col. 7, lines 2, 7, 42, 61, 62, 64 and 65; Col. 8, lines 10, 16, 22, 25, 31, 35, 41, 51 and 55; and Col. 9, lines 1 and 4:

Please cancel U-PickIt.com and replace it with U-Pick-It.com.

Signed and Sealed this
Fifth Day of April, 2011

David J. Kappos
*Director of the United States Patent and Trademark Office*